Patented June 21, 1932

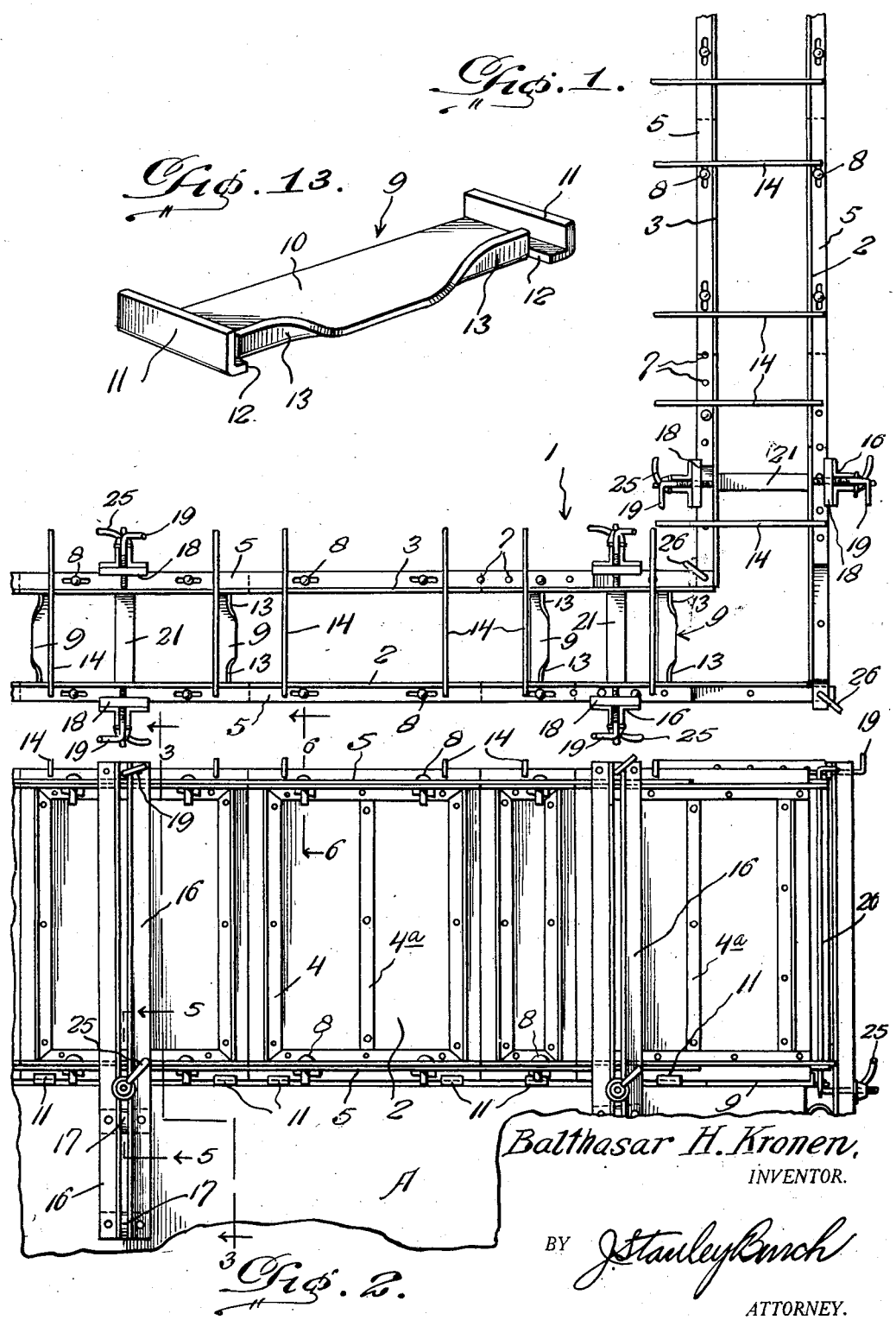

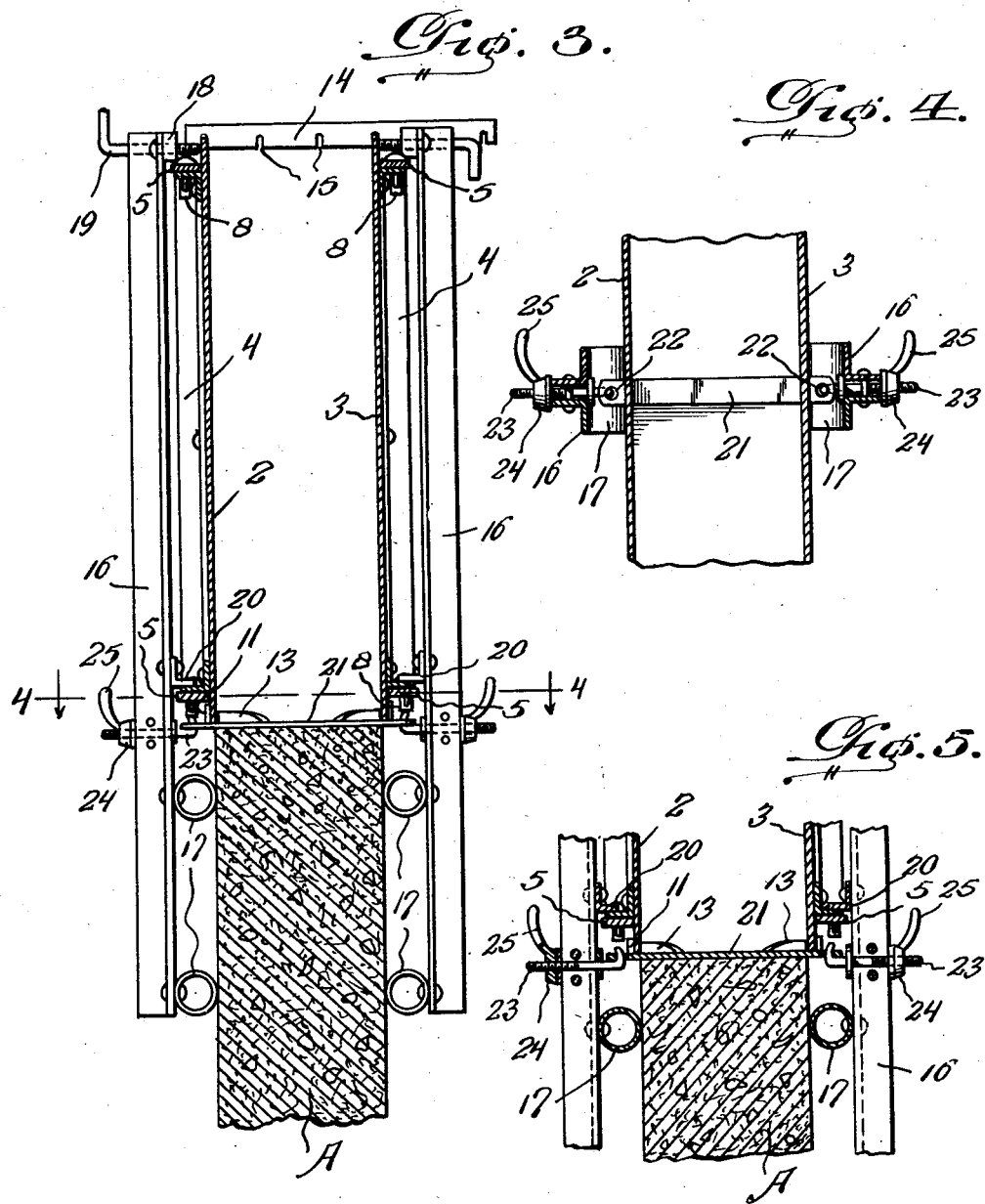

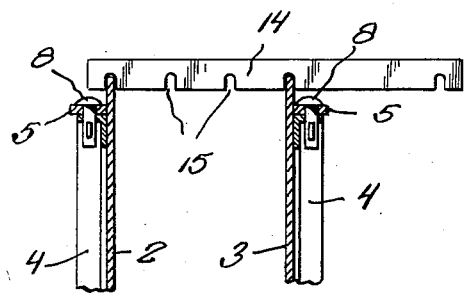
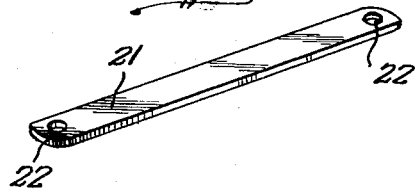
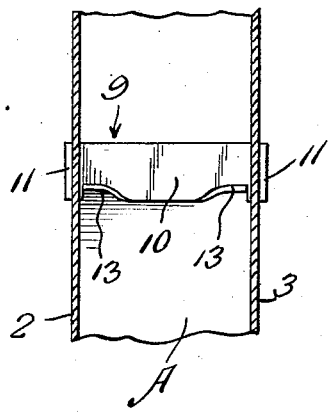
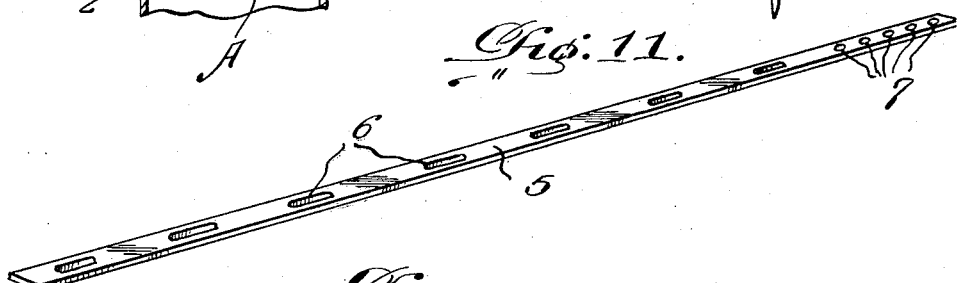
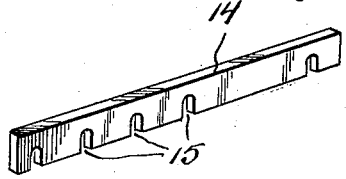
Balthasar H. Kronen,
INVENTOR.
BY
ATTORNEY.

1,864,444

UNITED STATES PATENT OFFICE

BALTHASAR H. KRONEN, OF TARENTUM, PENNSYLVANIA

APPARATUS FOR MOLDING WALLS

Application filed February 6, 1930. Serial No. 426,353.

The present invention relates to improvements in molds and has reference more particularly to an apparatus for forming plastic walls.

One of the important objects of the present invention is to provide an apparatus for building walls in situ, the apparatus including inner and outer units for disposition on opposite sides of the previously formed wall section, means being associated with the units for properly supporting the same in spaced relation and to further effect the formation of the next superjacent wall section in vertical alinement with the subjacent wall section.

Still another important object resides in the provision of an apparatus of the above-mentioned character wherein the same includes a means for adjusting the sections or units of the apparatus with respect to each other, supporting means for the lower edges of the spaced units being adapted to remain in the plastic material during the formation of the wall.

A further and salient object of the present invention is to provide an apparatus of the above-mentioned character wherein the same is of such construction as to facilitate the plumbing of the corner of the wall first so that the adjacent sides will be disposed at the proper angle with respect to each other.

Still another object is to provide an apparatus of the above-mentioned character that can be readily and easily assembled and disassembled and as a course of the wall is formed, the apparatus can be disassembled and positioned higher up to receive the next course of the plastic mass.

Other objects and advantages of the invention will become apparent from the following description when taken in connection with the accompanying drawings.

In the accompanying drawings wherein like reference characters indicate corresponding parts throughout the several views:

Figure 1 is a top plan view of the apparatus embodying my invention showing the same assembled to form the corner of a wall.

Figure 2 is a side elevation showing the apparatus supported above the concrete foundation.

Figure 3 is a vertical sectional view taken approximately on the line 3—3 of Figure 2 looking in the direction of the arrows.

Figure 4 is a transverse section taken substantially on the line 4—4 of Figure 3 looking downwardly.

Figure 5 is an enlarged detail sectional view showing the manner in which the opposed plates are supported by the saddle units, and also showing the manner in which the vertical bars are supported.

Figure 6 is a detail sectional view taken approximately on the line 6—6 of Figure 2.

Figure 7 is a top plan view of one of the saddle units showing the manner in which the inner and outer plates rest thereon.

Figure 8 is a detail perspective view of one of the short strips having apertures in the respective ends thereof.

Figure 9 is a detail perspective view of one of the hooked bolts for cooperation with the apertured strip shown in Figure 8.

Figure 10 is a detail perspective view of one of the elongated lining-up pins.

Figure 11 is a detail perspective view of one of the elongated alining strips.

Figure 12 is a detail perspective view of one of the notched spacing bars, and

Figure 13 is a perspective view of one of the saddle units.

In the drawings wherein for the purpose of illustration is shown the preferred embodiment of my invention, the numeral 1 designates generally my improved wall molding apparatus, the same comprising a series of rectangular shaped metallic plates 2 that are adapted to be disposed at the outer side of the mold, similar plates 3 being arranged for disposition at the inner side of the mold. Secured on the outer face of each sheet metal plate is a central vertical reinforcing strip 4a and a frame-work 4 constructed of angle iron material, and these features are more clearly disclosed in Figure 2 of the drawings.

The upper and lower portions of each frame 4 are formed with a series of spaced openings and the plates on each side of the mold are lined up in edge to edge abutting relation. Adapted to extend along the upper and lower faces of the top and bottom portions of the frame 4 of the abutting plates on each side of the mold are the elongated alining strips shown at 5 in Figure 11. These strips are formed with a series of equally spaced elongated holes 6 that are adapted to aline with the aforementioned holes formed in the upper and lower portions of the frame-work on each plate and one end of each alining strip 5 is additionally provided with a series of holes 7 that are arranged more closely together than the holes 6. Suitable headed pins 8 are removably fitted in the alining openings or holes formed in each strip 5 and the adjacent portion of the frame 4 as is also clearly shown in Figure 2, as well as in Figure 3 of the drawings.

The present invention further includes as a salient feature thereof, a series of saddle units such as is shown at 9 in Figure 13. Each unit comprises a metallic base 10, the ends of which are turned upwardly as at 11 while one longitudinal edge of the base 10 is formed with inwardly extending transverse slits 12 and the portion 13 between the slits 12 is directed upwardly so that the ends of the edge portion 13 are spaced with respect to the upturned ends 11 to provide a restricted channel for the reception of the lower edge portions of the respective side-forming plates 2 and 3.

In Figure 3 of the drawings, there is clearly illustrated the manner in which the spaced plates are supported by the saddle units after the concrete foundation A has been formed, the base portion 10 of each saddle unit being adapted to extend across the top of the preformed section of the plastic wall with the end portions of the saddle projecting beyond the respective side faces of said foundation. Also in Figure 7 there is clearly shown the relationship of the saddle with respect to the side walls of the mold.

These saddle units in addition to supporting the lower edges of the plates of the molding apparatus also constitute reinforcing means for the concrete wall as the saddle units will remain embedded in the plastic mass after the plates have been removed, the projecting ends of the saddles being trimmed in the usual manner so as not to project beyond the faces of the plastic wall.

The invention also includes the provision of a series of notched spacing bars, one of which is shown at 14 in Figure 12. The lower edge of the bar is formed with the notches 15 and these notches engage the upper edges of the spaced side forming plates 2 and 3 to maintain the same in proper spaced relation. The notches are formed in the bars 14 in such a manner as to adapt the same to be used in the formation of walls of different thicknesses. The notched spacing bars are however readily and easily attached and removed.

Also forming an important part of the present invention are the vertically disposed slotted members 16, each of which includes a pair of opposed angle iron bars bolted together in spaced relation. Carried by the lower end portion of each of the slotted members 16 are the vertically spaced relatively short tubes 17, the same being secured on the inner face of the slotted members 16. These tubes constitute bearing elements for engagement with the respective faces of the subjacent section of the concrete wall, it being understood of course that the slotted members are disposed vertically against the outer faces of the side forming walls of the molding apparatus.

The upper ends of the slotted members 16 terminate adjacent the upper edges of the plates and a transverse block 18 is carried by the upper end of each slotted member on the inner face thereof and through which block is threaded an adjusting screw 19, the inner ends of the adjusting screws being adapted to engage against the outer faces of the respective side forming plates 2 and 3 whereby to plumb or aline the plates with the respective faces of the subjacent section of the concrete wall as is readily obvious from the construction shown in Figure 3.

The supporting means for the slotted members 16 includes the angular stirrups 20 that are arranged on the face of the slotted members, the stirrups being adapted to engage with the horizontal portions of the rectangular frames 4 of the adjacent plates 2 and 3 as also clearly disclosed in Figures 3 and 5.

Also adapted to extend across the upper face of the previously formed section of the concrete wall are the relatively short strips 21, the ends of each strip being formed with suitable openings 22 as shown very clearly in Figure 8. These strips are of such length as to have their apertured ends projecting beyond the sides of the wall already formed and cooperating with the opposite ends of the short strip are the hooked bolts 23, the shanks of the bolts extending through the slotted members 16 and threaded on the outer threaded ends of the shanks of these bolts are suitable nuts 24 provided with actuating handles 25. Appropriate washers are associated with the hooked bolts 23 as also shown very clearly in the drawings.

In the use of my improved apparatus, it is first necessary to plumb the corner and the plates are therefore arranged very carefully in order to procure an accurate relation and angular relation of the adjacent walls to be formed. In this respect suitable lining up pins 26 extend through registering openings formed in the overlapping ends of extensions formed on the outermost corners of the frames carried by the corner plates and this is clearly shown in Figures 1 and 2 of the drawings. After the corner plates have been properly positioned, the side wall forming plates may then be lined up by the use of the alining strips and supported in their proper spaced relation through the medium of the saddle units 9 and the notched bars 14 and the plates will be properly held in position and also in alinement with the faces of the already formed concrete foundation by reason of the slotted members 16 and any slight adjustments that are necessary to assure a true vertical plane may be made by actuating the adjusting screws 19 and the hooked bolts 23.

When the parts are arranged as shown in Figure 3, the concrete can be poured into the mold and after the plastic mass has sufficiently hardened, the parts of the mold can be readily and easily removed all with the exception of the saddle units 9 and the strips 21 which remain embedded in the concrete wall. The molding apparatus is then shifted upwardly and assembled so as to form the next course of the wall.

The simplicity of my apparatus enables the parts to be readily and easily set up and adjusted and furthermore by employing an apparatus of this character the number of men necessary to carry out the building of a wall will be reduced to a minimum. It is possible for two men alone to build a wall with my apparatus. Furthermore my wall mold will at all times be positive and efficient in carrying out the purposes for which it is designed as well as being strong and durable.

While I have shown the preferred embodiment of the invention, it is understood that minor changes in the size, shape and arrangement of parts may be resorted to without departing from the spirit of the invention and the scope of the appended claims.

What I claim as new is:

1. In a wall mold, inner and outer forming walls, a saddle unit for rest upon a foundation and comprising a substantially U-shaped member upon which the lower edges of said walls repose, and having its opposed parallel sides engaging the outer faces of the adjacent walls, means including said parallel sides of the saddle unit for effectively engaging and supporting said walls on the saddle unit, and means engaging the upper edges of said walls and cooperating with the saddle unit to hold said walls uniformly spaced apart.

2. In a wall mold, inner and outer forming walls, a saddle unit for rest upon a foundation, and comprising a substantially U-shaped member upon which the lower edges of said walls repose, and having its parallel edges engaging the outer faces of the adjacent walls, one longitudinal edge of said saddle unit being extended upwardly to define with said parallel sides, channels in which the lower edges of said walls are received and effectively supported, and means engaging the upper edges of said walls to hold the latter in spaced relation.

3. In a wall mold, inner and outer forming walls, a series of spaced saddle units for rest upon a foundation, each comprising a substantially U-shaped member having one longitudinal edge and its opposed parallel sides defining channels to receive and effectively support the lower edges of said walls, means engaging the upper edges of said walls to hold the latter in spaced relation, vertical members disposed exteriorly of and supported by said forming walls, adjustable means carried by the upper ends of said members to engage the adjacent ends of said forming walls, a flat metallic strip arranged transversely on said foundation and between adjacent pairs of said saddle units, and upon which the lower edges of said forming walls repose, the ends of said strip projecting beyond said walls and having openings therein, and adjustable hook bolts carried by said vertical members and engaging the apertured ends of said strip to properly aline said forming walls with the adjacent faces of said foundation.

In testimony whereof I affix my signature.

BALTHASAR H. KRONEN.